United States Patent
Kish et al.

(10) Patent No.: US 10,171,492 B2
(45) Date of Patent: Jan. 1, 2019

(54) DENIAL-OF-SERVICE (DOS) MITIGATION BASED ON HEALTH OF PROTECTED NETWORK DEVICE

(71) Applicant: Fortinet, Inc., Sunnyvale, CA (US)

(72) Inventors: William A. Kish, Millerton, NY (US); Sergey Katsev, Pleasant Valley, NY (US)

(73) Assignee: Fortinet, Inc., Sunnyvale, CA (US)

( * ) Notice: Subject to any disclaimer, the term of this patent is extended or adjusted under 35 U.S.C. 154(b) by 235 days.

(21) Appl. No.: 15/192,575

(22) Filed: Jun. 24, 2016

(65) Prior Publication Data
US 2017/0374097 A1 Dec. 28, 2017

(51) Int. Cl.
*H04L 29/06* (2006.01)

(52) U.S. Cl.
CPC .......... *H04L 63/1458* (2013.01); *H04L 63/14* (2013.01); *H04L 63/1441* (2013.01)

(58) Field of Classification Search
CPC ..... H04L 63/14; H04L 63/0254; H04L 63/02; H04L 63/0245; H04L 2463/143
See application file for complete search history.

(56) References Cited

U.S. PATENT DOCUMENTS

| | | | | |
|---|---|---|---|---|
| 7,584,507 B1 * | 9/2009 | Nucci | ................. | H04L 63/1416 726/22 |
| 7,760,722 B1 * | 7/2010 | Tripathi | .............. | H04L 63/1458 370/389 |
| 2005/0060573 A1 * | 3/2005 | D'Souza | ............. | H04L 63/1441 726/4 |
| 2006/0075084 A1 * | 4/2006 | Lyon | ................. | H04L 29/06027 709/223 |
| 2007/0064610 A1 * | 3/2007 | Khandani | ............... | H04L 47/10 370/235 |
| 2008/0040801 A1 * | 2/2008 | Buriano | .............. | H04L 63/1408 726/22 |
| 2009/0013404 A1 * | 1/2009 | Chow | ................. | H04L 63/1458 726/22 |
| 2009/0293123 A1 * | 11/2009 | Jackson | .............. | H04L 63/1458 726/23 |
| 2012/0174220 A1 * | 7/2012 | Rodriguez | .......... | H04L 63/1416 726/23 |

(Continued)

*Primary Examiner* — Eleni A Shiferaw
*Assistant Examiner* — Sher A Khan
(74) *Attorney, Agent, or Firm* — Hamilton, DeSanctis & Cha LLP

(57) ABSTRACT

Systems and methods for improving the performance of DDoS mitigation by monitoring the health of a protected network resource are provided. According to one embodiment, health of a network device protected by DoS mitigation device can be evaluated and packet/traffic received on the DoS mitigation device can be selectively/conditionally forwarded to the protected network device or can be dropped based on the health of the protected network device. According to one embodiment, at-least a part of the traffic is blocked when the health of the protected network device is below a predetermined health threshold. In an exemplary implementation, a measure of volume of traffic originated by different computing devices and handled by the protected network device can be computed, and packet filtering or conditional forwarding can be enabled when the computed measure of volume of traffic exceeds a predetermined traffic volume threshold.

20 Claims, 10 Drawing Sheets

(56) References Cited

U.S. PATENT DOCUMENTS

2014/0321462 A1* 10/2014 Kancherla ............... H04L 45/72
370/389
2016/0164912 A1* 6/2016 Del Fante ........... H04L 63/1416
726/23
2016/0294871 A1* 10/2016 Huston, III ......... H04L 63/1458

* cited by examiner

500

DoS Mitigation Device

POLICY RULES

☐ Traffic Volume Based DoS Mitigation

○ Block Subsequent Connection/Service Request, If the number of Active Connection is Greater than [1000 ▽]

☑ Server Health Status Based DoS Mitigation

○ Block Subsequent Connection/Service Request

☐ If Server CPU Utilization is Greater than [65% ▽]

☑ If Server Memory Utilization is Greater than [70% ▽]

☑ If Server Load is Greater than [80% ▽]

☐ If Server Latency is Greater than [5ms ▽]

☐ Traffic Volume and Server Health Status Based DoS Mitigation

○ Subsequent Suggested Traffic, If Number of Active Connections is Greater [1000 ▽] and Server Health Status is Below than [70% ▽]

☐ Response Time Based DDoS Mitigation

[ Edit ]　　[ Submit ]

FIG. 5

DENIAL-OF-SERVICE (DOS) MITIGATION BASED ON HEALTH OF PROTECTED NETWORK DEVICE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2016, Fortinet, Inc.

BACKGROUND

Field

Embodiments of the present invention generally relate to detection and mitigation of Denial of Service (DoS) attacks. More particularly, embodiments of the present invention relate to mitigation of DoS attacks by a DoS mitigation device based on the health/performance status of one or more protected network devices that the DoS mitigation device protects.

Description of the Related Art

As more and more devices of different types and form factors are connected to the Internet, and to infrastructures e.g. transportation systems, healthcare systems, financial transaction platforms, education systems, traffic management systems, among others, the devices and users thereof are becoming dependent on the access to Internet, and it is also becoming desirable that the Internet becomes and remains secure along with providing maximum availability. However, the challenge that the Internet faces is from cyber attackers who are armed with different types of cyber attacks e.g. Denial-of-Service (DoS) attacks and, in particular, distributed Denial-of-Service (DDoS) attacks, phishing techniques, spamming, and so on. Cyber attackers have different intents and attack computer systems/networks to disrupt services to legitimate users or to get financial, strategic, and or political gain.

A DDoS attack is one that is critical and represents a continuous cyber threat that attacks protected devices e.g. servers or other critical infrastructure or resources of a protected network to make the protected devices, computer systems/machines, or a protected network resource, unavailable to legitimate users. A typical DDoS attack causes loss of service or network connectivity to legitimate users. Although the means to carry out, motives for, and targets of a DoS attack may vary, it generally consists of efforts to temporarily or indefinitely interrupt or suspend services of a protected device or of a protected network connected to the Internet.

Most common DoS attacks aim to exhaust computational resources e.g. connection bandwidth, memory space, or CPU time by, for example, flooding a target network node/resource with valid or invalid requests and/or messages. A typical DDoS attack is initiated by one or more people or zombies/bots so as to burden an intended protected device, for example, a server, with numerous dummy requests. A DDoS attack is basically a DoS attack that, instead of using a single computer as a base of attack, uses multiple compromised computers simultaneously, possibly a large or a very large number of them, thus amplifying the effect, so as to exhaust the resources of protected device or network. Resources of protected device e.g. a server, an authentication engine, a database, among others are exhausted by such false requests of service to an extent such that the protected device is not be able to serve even the genuine/legitimate users.

In sum, illegitimate users/bots flood the network with an overwhelming number of packets that exhausts the network or application resources. In particular, the packets may be targeting one particular network node, for instance a router, a switch, a gateway, an application server, causing such node to crash, reboot, or exhaust its computational resources. The compromised computers, which are also commonly referred to as zombies, are typically infected by malicious software (worm, virus, or Trojan) in a preliminary stage of the attack, which involves scanning a large number of computers and searching for those vulnerable. The attack itself is then launched at a later time, either automatically or by a direction action of an attacker.

As described above, these DDoS attacks have become a common tool of hackers for targeting a web service or a network resource. By bombarding a server with traffic, they can make it impossible for legitimate users to secure a connection, effectively taking a site offline.

Prior solutions attempt to detect DDoS attacks and prevent such attacks by monitoring and filtering traffic directed to the protected device. Attempts have also been made to distinguish traffic initiated by legitimate users from traffic initiated by DDoS attackers. Various statistical analysis based solutions have been proposed for detecting and preventing DDoS attacks at the physical layer to application level services.

Most existing DDoS detection and prevention systems, also referred to as DDoS mitigation systems, work as in-line filters between client devices and a protected device/server, wherein these DDoS mitigation systems monitor the traffic between the client devices (some of which might be controlled by one or more attackers (e.g., a zombie) and some of which represent legitimate client devices) and the protected device, and blocks traffic directed to the protected device based on some predefined or dynamically calculated adaptive threshold of allowed traffic volume. These DDoS mitigation systems therefore block traffic directed to the protected device when the threshold of allowed traffic volume is reached. As distinguishing between traffic originating from a legitimate user and traffic originating from an attacker/zombie is not always possible, existing DDoS mitigation systems block the traffic from the legitimate user as well as that from the attacker/zombie when the traffic volume reaches the predefined threshold. This is a coarse approach, which unnecessarily blocks traffic even when the protected device has resources to manage further incoming traffic. In most of the cases, traffic volume reaching a particular defined threshold does not necessarily mean that the protected device would not be able to handle traffic that slightly exceeds the defined threshold.

Many existing DDoS mitigation systems rely heavily on the number of active connections maintained by the protected device to determine whether a new connection request or service request or traffic directed to the protected device should be forwarded to the protected device. In some cases, the threshold for the number of active connections or traffic volume, based on which these DDoS mitigation systems make their decisions to allow further connections or traffic volume is configured conservatively. That is, the threshold is set much lower than the actual number of active connection or actual traffic volume that the protected device can manage to serve. For example, if a protected device can serve 2,000 active connections or can receive 2,000 requests per second, existing DDoS mitigation systems might be configured not to allow more than 1,000 active connections or 1,000 requests per second. Once the threshold of 1,000 active connections or 1,000 requests within a second is met, such a DDoS mitigation system blocks all subsequent connection requests even if the protected device still has enough resources to serve some more connections. In such cases, even the traffic originating from the legitimate users is denied because the DDoS mitigation system does not allow any traffic to be directed to the protected device. Such approaches by existing DDoS mitigation systems therefore minimize optimal utilization of protected devices or protected network resources and result in access to the protected resource being denied to both malicious sources and legitimate users.

Therefore, there exists a need for systems and methods that can be implemented in, for instance, DoS mitigation devices to mitigate DDoS attacks, and at the same time allow optimal utilization of the computing resources of protected network device(s).

SUMMARY

Systems and methods are described for improving the performance of DoS mitigation by monitoring health of a protected network resource. According to one embodiment, health of a network device protected by DoS mitigation device can be evaluated and packet/traffic received on the DoS mitigation device can be selectively/conditionally forwarded to the protected network device or can be dropped based on the evaluated health of the protected network device. According to one embodiment, when the health of the protected network device is below a predetermined health threshold, at least a part of the traffic is blocked. In an exemplary implementation, a measure of volume of traffic originated by different computing devices and being handled by the protected network device can be computed, and packet filtering or conditional forwarding can be enabled when the computed measure of volume of traffic exceeds a predetermined traffic volume threshold.

Other features of embodiments of the present invention will be apparent from the accompanying drawings and from the detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 5 illustrates an exemplary DoS Mitigation Policy Definition Interface of a DoS mitigation system in accordance with an embodiment of the present invention.

DETAILED DESCRIPTION

Figure 1A:
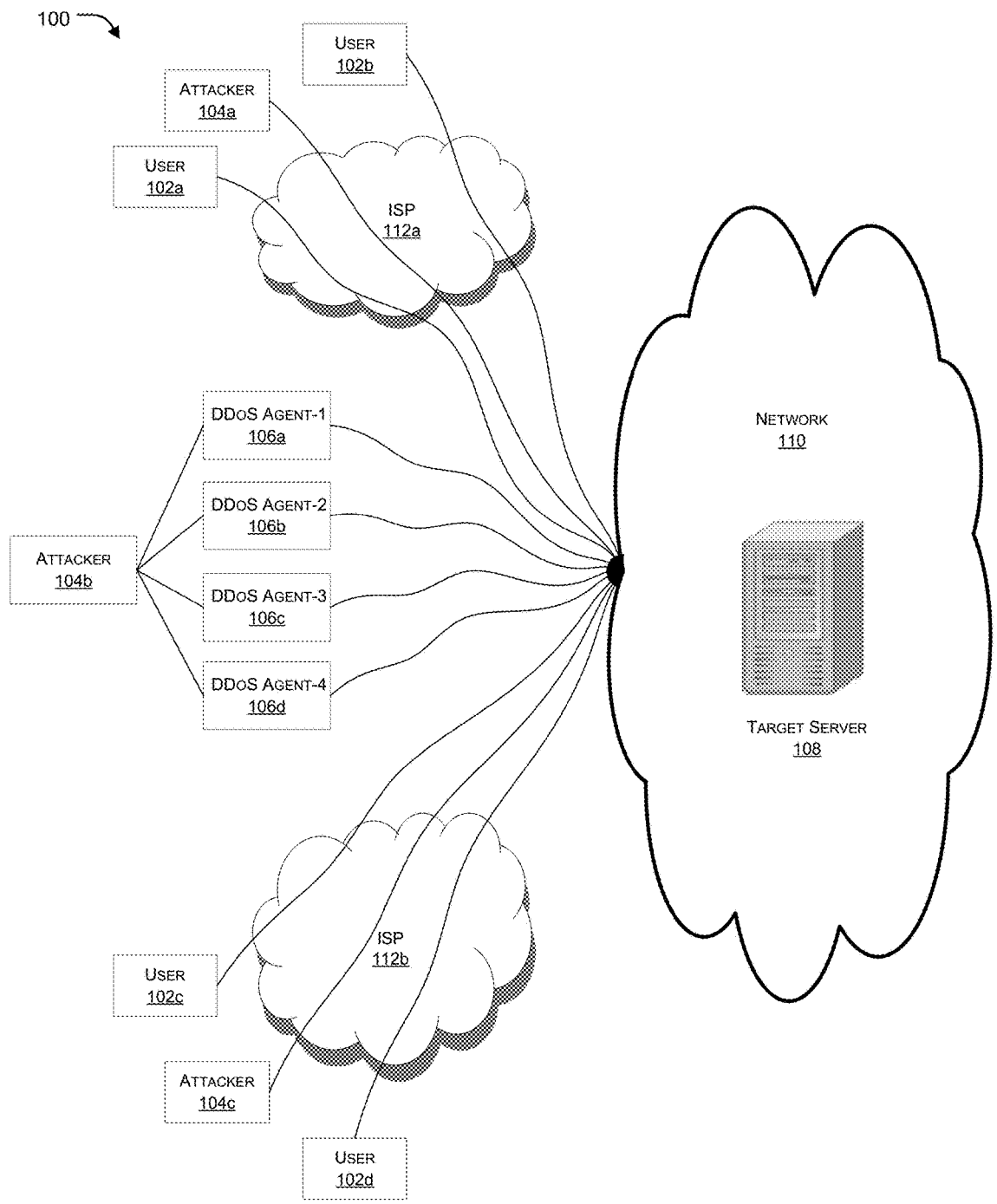
FIG. 1A conceptually illustrates how typical DoS attacks are performed.

Systems and methods are described for improving the performance of DDoS mitigation by monitoring the health of a protected network resource.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, e.g. ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, e.g. software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of DOS mitigation, it should be appreciated that the same has been done merely to illustrate the invention in an exemplary manner and any other purpose or function for which the explained structure or configuration can be used, is covered within the scope of the present disclosure.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named Systems and methods are described for improving the performance of DoS mitigation by monitoring health of a protected network resource. According to one embodiment, health of a network device that is protected by a DoS mitigation device can be evaluated, and packet/traffic received on the DoS mitigation device can be selectively/conditionally forwarded to the protected network device or dropped based on the evaluated health of the protected network device. According to one embodiment, at-least a part of the traffic is blocked when the health of the protected network device is below a predetermined health threshold. In an exemplary implementation, a measure of volume of traffic originated by different computing devices and being handled by the protected network device can be computed, and packet filtering or conditional forwarding can be enabled when the computed measure of volume of traffic exceeds a predetermined traffic volume threshold.

In an exemplary implementation, health of the protected network device can be monitored in real-time or on a periodic basis, wherein the health of the protected network device can be evaluated based on different attribute(s), e.g., latency between the protected network device and the DoS mitigation device, response time by the protected network device to the DoS mitigation device, one or more performance attribute values of the protected network device, load on the protected network device, memory utilization of the protected network device, processor utilization of the protected network device, and network utilization of the protected network device. Health of the protected network device can be monitored for both potential asynchronous (out-of-band) processes and for in-line traffic being processed by the DoS mitigation device.

According to an embodiment, measure of volume of traffic can be defined based on number of connections per second being handled by the protected network device.

In an exemplary implementation, DoS mitigation device can be part of an application delivery controller (ADC) or can be a stand-alone device. In different implementations, the protected network device can be a server, and the different computing devices can be client devices, e.g., a laptop, a tablet PC, a desktop PC, a mobile phone, a smart phone, among other like computing devices.

Other features of embodiments of the present invention will be apparent from the accompanying drawings and from the detailed description that follows.

FIG. 1A conceptually illustrates how typical DoS attacks are performed. As shown in FIG. 1A, a target server 108 residing within a network 110 can receive connection requests from different users, for example, user 102*a*, user 102*b*, user 102*c*, and user 102*d*, which may be collectively referred to as user 102 or legitimate client 102, to provide service(s) enabled by target server 108. Connection between users 102*a-d* and target server 108 can be through different Internet service providers (ISPs), for example ISP 112*a* and ISP 112*b*. To prevent target server 108 from providing services to legitimate clients 102, an attacker or attackers, for example attacker 104*a*, attacker 104*b*, and attacker 104*c*, which may be collectively referred to as attacker 104, can send multiple dummy requests to the target server 108 directly or through DoS agents, for example DoS agent 1 106*a*, DoS agent 2 106*b*, DoS agent 3 106*c*, and DoS agent 4 106*d*, in an attempt to exhaust computing resources or network resources of target server 108.

Figure 1B:
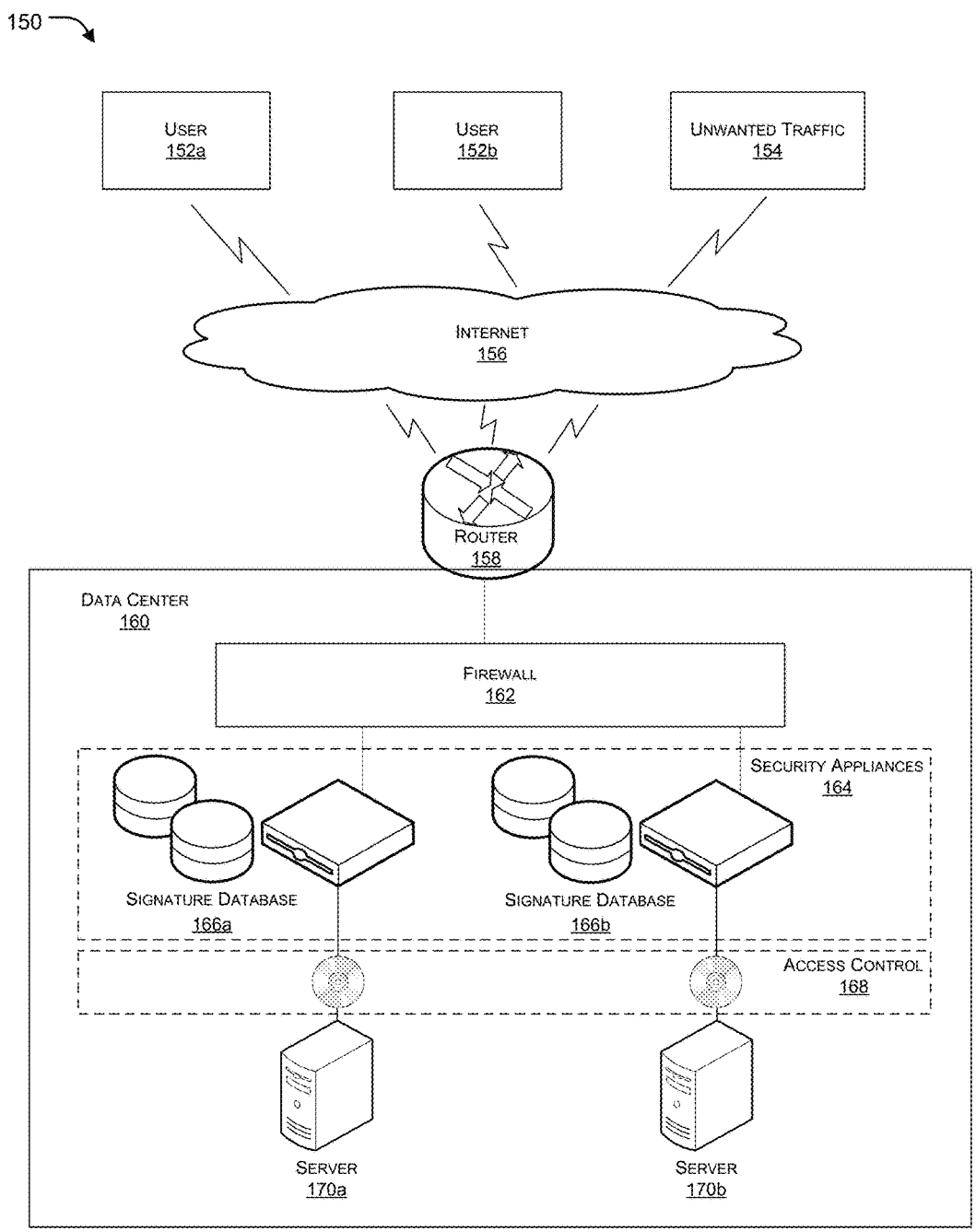
FIG. 1B illustrates exemplary network architecture for protecting a data center or protected network device that can used in accordance with an embodiment of the present disclosure.

FIG. 1B illustrates exemplary network architecture 150 for protecting a data center 160 or protected network device that can used in accordance with an embodiment of the present disclosure. As shown in FIG. 1B, data center 160 or a protected network may have several network devices that need to be protected against, among other threats, DoS or DDoS attacks. Network architecture 150 can include a router 158 connecting data center 160 with a public network (e.g., the Internet 156). Data center 160 can be configured with a firewall 162 and may have one or more other security appliances 164 to monitor network traffic entering/leaving the protected network devices, e.g., server 170*a* and server 170*b*. Security appliances 164 may have signature databases, e.g. signature database 166*a* and signature database 166*b*, for storing signatures based upon which the security appliances 164 can detect a DoS attack or other malicious network activity. In an exemplary implementation, firewall 162 or security appliances 164 can be configured to detect exhaustion of computing resources or network resources of one or more protected network devices, which may also be referred to interchangeably as simply network devices. Security appliance 164 or a network security device configured to perform DoS mitigation may be referred to interchangeably as a DoS mitigation device. In an exemplary implementation, a mechanism of access control 168 (e.g., an Application Delivery Controller (ADC)) can be logically interposed between the protected network devices 170 to provide them with another level of protection. Health status of protected network devices 170, for example server 170a and server 170b, can be monitored at regular intervals by the DoS mitigation device, implemented, for example, within the security appliances 164 or the ADC (not shown). A stand-alone DoS mitigation device can alternatively be configured to protect one or more protected network devices or protected network resources by mitigating DoS attacks. Those skilled in the art will appreciate that network architecture 150 of FIG. 1B is completely exemplary, and various alternatives are possible, for example, in which a DoS mitigation device or network security device is configured to (directly or indirectly) protect and evaluate a health status of protected network resources.

Figure 2:
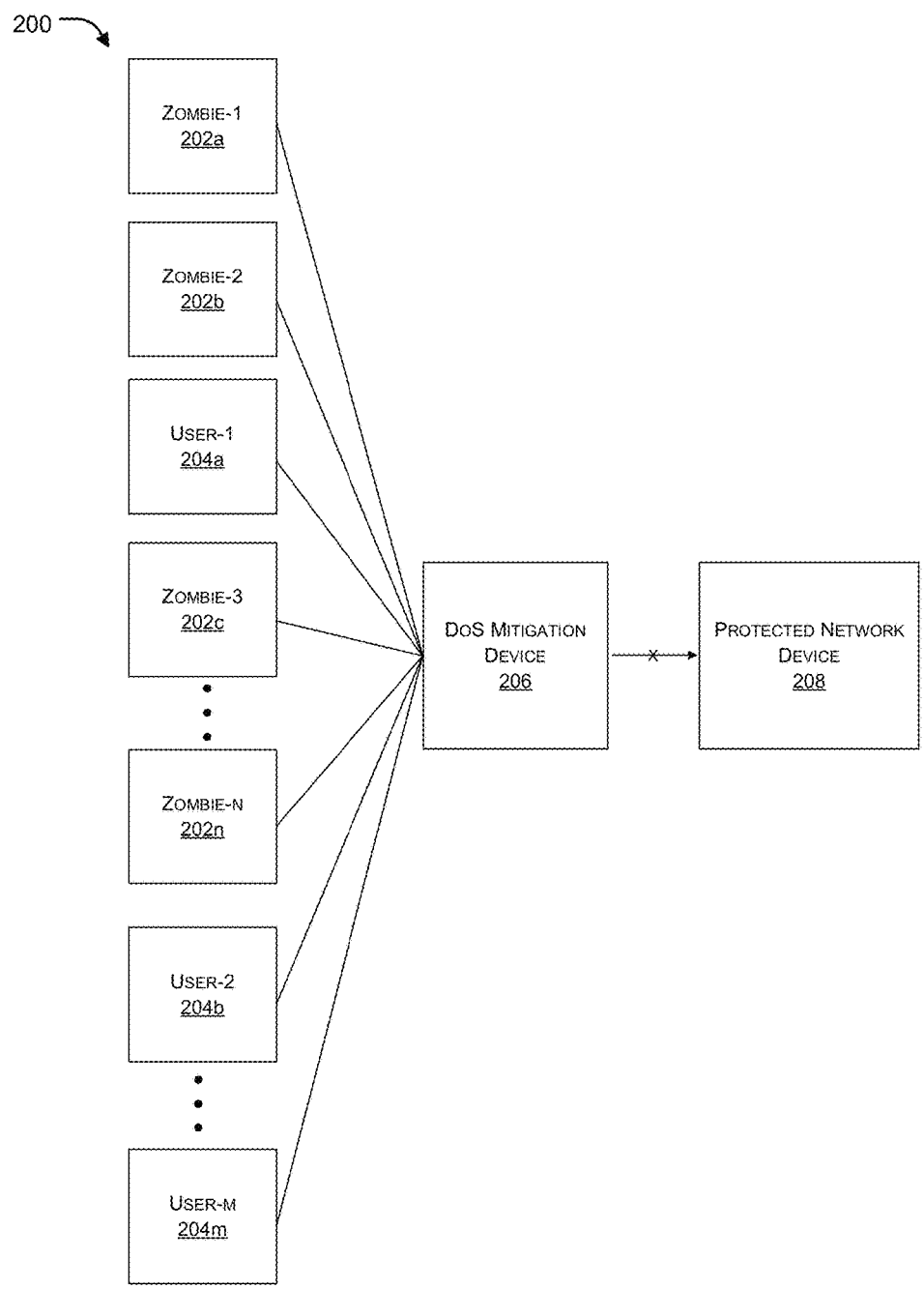
FIG. 2 conceptually illustrates an exemplary network architecture having an in-line DoS mitigation device logically interposed between external client devices and a protected network device in which aspects of the present invention can be implemented.

FIG. 2 conceptually illustrates an exemplary network architecture 200 having an in-line DoS mitigation device 206 logically interposed between external client devices 202a-n and 204a-m and a protected network device 208 in which aspects of the present invention can be implemented. As shown in FIG. 2, DoS mitigation device 206 can be placed so as to to mitigate DoS attacks directed at protected network device 208 by DoS attackers, for example, by zombies-1 202a-n. DoS mitigation device 206 receives traffic directed to protected network device 208, either generated by attackers or by legitimate users, e.g., user 204a-m.

A traditional DoS mitigation device might simply block all traffic to protected network device 208 upon detecting the existence of a DoS attack or upon determining a predefined active connection threshold has been reached. Such a traditional DoS mitigation device monitors the number of active connections with protected network device 208 and once the number exceeds a predefined threshold of active connections, the DoS mitigation device may block all subsequent traffic directed to protected network device 208, regardless of whether such traffic is from an attacker (e.g., zombies 202a-n) or from legitimate users (e.g., users 204a-m).

In contrast, in embodiments of the present invention, DoS mitigation device 206, in addition to monitoring the number of active connections with protected network device 208, also monitors other health parameters, e.g., latency between protected network device 208 and DoS mitigation device 206, response time by protected network device 208 to DoS mitigation device 206, one or more performance attributes of protected network device 208, non-limiting examples of which include, a load on protected network device 208, a memory utilization of protected network device 208, a processor utilization of protected network device 208, and a network utilization of protected network device 208. In an aspect, DoS mitigation device 206 can start monitoring one or more of the health parameters once the number of active connections with protected network device 208 reaches a predefined threshold. In another aspect, DoS mitigation device 206 may continue to monitor the health parameters of protected network device 208 regardless of whether the number of active connections exceeds the predefined threshold. DoS mitigation device 206 can determine whether protected network device 208 is actually experiencing performance issues due to the effects of a DoS attack, which may be indicated by the monitored health parameters showing signs of impact outside of defined norms.

In one embodiment, DoS mitigation device 206 may implement a first layer/stage of mitigation that does not cause all packets directed to protected network device 208 to be dropped, wherein the first state of mitigation can be activated when the number of active connections exceeds the predefined threshold. The first stage of mitigation can be configured to be activated based on other monitored health parameters as well. DoS mitigation device 206 may analyse traffic behavior of different computing devices connected to protected network device 208 during the first stage of mitigation, and can accordingly allow some traffic to continue to be directed to protected network device 208 while blocking other traffic. In an aspect, DoS mitigation device 206 can be implemented within an application delivery controller (ADC), which can monitor health parameters of protected network device 208. In particular, response time or latency of protected network device 208 might be measured. Other health parameters, e.g., load on protected network device 208 can also be monitored using a specialized application programming interface (API) (e.g.

FortiADC-E, available from the assignee of the present invention, which provides server agent functionality that allows an administrator to write a custom script to run on the server and report information to the ADC), wherein the load information can be used to determine when protected network device 208 is overloaded or in danger of becoming overloaded.

In an aspect therefore, DoS mitigation device 206, rather than simply using a threshold to determine when to block all traffic directed to protected network device 208, monitors performance of protected network device 208 in order to determine whether protected network device 208 is performing within expected ranges and can handle additional traffic. While DoS mitigation device 206 determines protected network device 208 can handle more requests, connection requests from legitimate clients are continued to be allowed.

Figure 3:
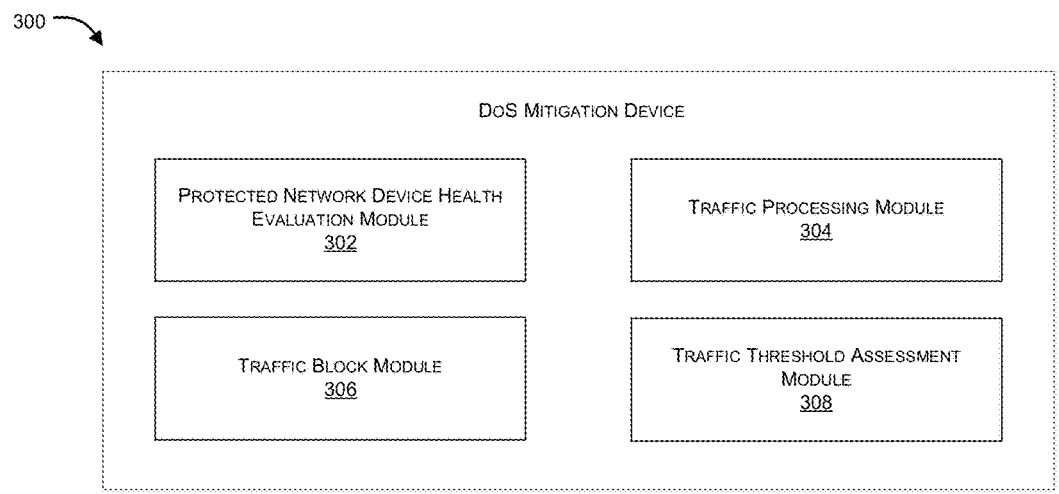
FIG. 3 illustrates exemplary functional modules of a DoS mitigation device in accordance with an embodiment of the present invention.

FIG. 3 illustrates exemplary functional modules of a DoS mitigation device 300 in accordance with an embodiment of the present invention. DoS mitigation device 300 can include one or more processors (not shown), and a non-transitory storage device (not shown) coupled to the one or more processors and having embodied therein instructions representing a protected network device health evaluation module 302, which when executed by the one or more processors evaluates one or more parameters indicative of the health of a network device protected by DoS mitigation device 300. DoS mitigation device further includes a traffic processing module 304, which when executed by the one or more processors, receives traffic from one or more computing devices that is directed to the protected network device, and selectively forwards the traffic to the protected network device or drops the traffic based on the health of the protected network device.

In an exemplary implementation, the instructions further represent a traffic block module 206, which when executed by the one or more processors, blocks at least a part of the traffic when the health of the protected network device is below a predetermined health threshold. DoS mitigation device 300 may allow at least part of the traffic directed to the protected network device when the health of the protected network device is below the predefined health threshold as described further below.

In an exemplary implementation, the instructions further represent a traffic threshold assessment module 308, which when executed by the one or more processors, can be configured to compute a measure of a volume of traffic originated by the one or more computing devices and being handled by the protected network device. In an embodiment, the measure of the volume of traffic can be defined based on a number of connections per second being handled by the protected network device. In one embodiment, the protected network device health evaluation module 302 can be triggered responsive to the computed measure of the volume of traffic exceeding a predetermined traffic volume threshold.

In an exemplary implementation, health of the protected network device can be monitored in real-time or on a periodic basis by DoS mitigation device 300. Suitable protocols or APIs can be used for monitoring the health of the protected network device. In an aspect, the health of the protected network device can be evaluated based on one or more of a variety different attribute(s), for example, latency between the protected network device and DoS mitigation device 300, response time by the protected network device to DoS mitigation device 300, one or more performance attribute values of the protected network device, load on the protected network device, memory utilization of the protected network device, processor utilization of the protected network device, and network utilization of the protected network device. In another aspect, health of the protected network device can be monitored for both asynchronous (out-of-band) processes as well as for in-line traffic being processed by DoS mitigation device 300.

A higher latency between the protected network device and the DoS mitigation device can be an indicator of poor health of the protected network device as a result of a DoS attack. Responsive thereto, DoS mitigation device 300 can block traffic or part of the traffic directed to the protected network device when the observed latency is higher than a predefined or configurable threshold value of latency. Similarly, a higher than usual response time by the protected network device can be an indication of poor health of the protected network device, and based on same, DoS mitigation device 300 can block traffic or part of the traffic when the response time of the protected network device is greater than a predetermined or configurable threshold value of response time. Similarly, DoS mitigation device 300 can evaluate load, memory/processor/resource utilization of the protected device, for instance, a web server, an electronic mail server, an application server, a real-time communication server, a file transfer protocol (FTP) server, a collaboration server, a list server, a Telnet server or an open source server, in physical and/or virtual form, and accordingly filter the incoming traffic directed to the protected device. Those skilled in the art will recognize that various other parameters can be used to measure the heath of a protected network device.

In an exemplary implementation, DoS mitigation device 300 can use one or more predefined health parameters to determine the overall health of the protected network device, and can make a traffic forwarding decision based on the overall health (e.g., based on a comparison of the overall health to a predetermined or configurable health threshold value). When the overall health of the protected network device is below the threshold, DoS mitigation device 300 can block all or some portion of traffic directed to the protected network device.

In an exemplary implementation, traffic processing module 304 can use any individual or a combination of one or more health parameters, and can use corresponding thresholds of health parameters for making appropriate traffic forwarding or blocking decisions. Traffic processing module 304 can selectively forward the traffic to the protected network device or drop the traffic based on the one or more individual health parameters of the protected network device. In another exemplary implementation, the overall health of the protected network device can be computed based on a combination of defined health parameters, which can also be appropriately weighted in accordance with predetermined or configurable weighting factors, and the overall health value can be compared with an overall health threshold in order to determine how to handle traffic directed to the protected network device.

In an exemplary implementation, DoS mitigation device 300 can be part of an ADC or can be a stand-alone device. Depending upon the particular network environment at issue, the protected network device may be one or more physical or virtual servers or may represent other types of protected network resources, including, but not limited to databases or other data storage mechanisms, and end-user devices, for example, laptops, tablets, personal computers (PCs) and the like.

By relying on health status of a protected network resource, DoS mitigation device 300 can enable maximum utilization of computing resources and network resources of the protected network device as it does not simply block all traffic directed to the protected network resource based solely on a current number of active connections with the protected network resource. An advantage of the proposed approach is illustrated with the following comparison to an existing DoS mitigation approach that stops all connection requests/traffic directed to the protected network device once a predefined threshold of a number of active connections, for example 1,000 connections per second, is reached, despite the fact that the protected network device might be able to handle significantly more connections per second, for example 2,000 connections per second. The threshold number of active connections is generally determined based on normal levels of traffic observed in the past. As such, when the observed traffic level is at 1,200 connections per second, the traditional DoS mitigation device may block all new connections until the number of active connection drops below the threshold. In contrast, in accordance with embodiments of the present invention, DoS mitigation device 300, by periodically and/or in real-time monitoring the health of the protected network device (by, for example, verifying that the response time/latency (or other performance parameters noted above) is within an acceptable range, can decide not to drop traffic directed to the protected network device, despite the fact that a threshold relating to a number of active connections has been exceeded.

In an embodiment, DoS mitigation device 300 can allow a network administrator to change the threshold of number of active connections based on which traffic processing module 204 can be activated. DoS mitigation device 300 can also enable network administrator to change parameters for monitoring the health of the protected network device. DoS mitigation device 300 can be configured to use predefined policy rules, which include details of the threshold of number of the active connections and one or more health parameters. In an exemplary implementation, traffic processing module 304 can be configured to use policy rules that include conditions, for example health parameters to be evaluated and used for making appropriate forwarding decisions and identifying actions to be taken when such conditions are met. In an exemplary implementation, DoS mitigation device 300 can be configured to use any or combination of conditions, which can be defined as policy rules, based on which DoS mitigation can be performed.

Figure 4A:
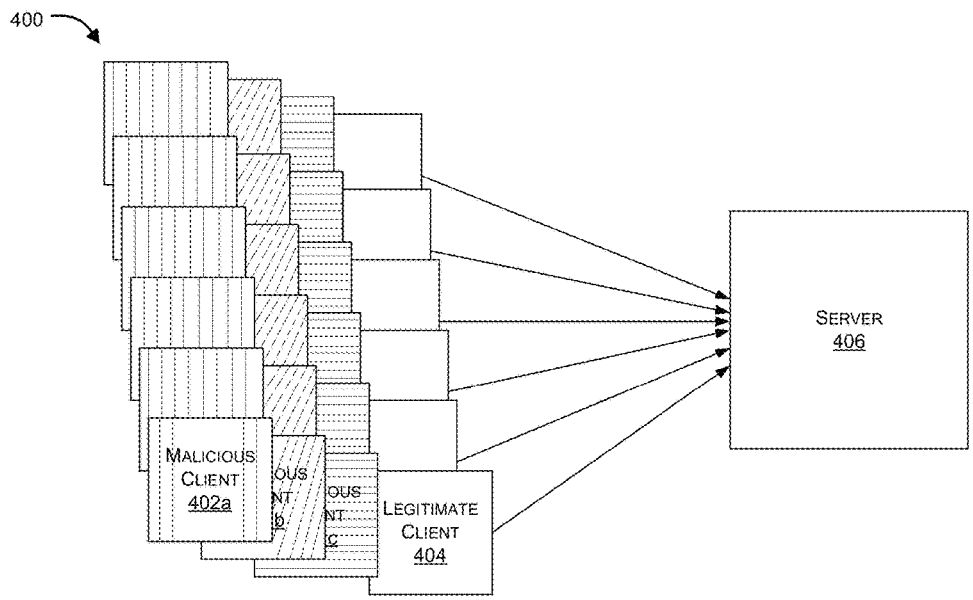
FIGS. 4A to 4D conceptually illustrate operation of a DoS mitigation device in accordance with an embodiment of the present invention.
Figure 4B:
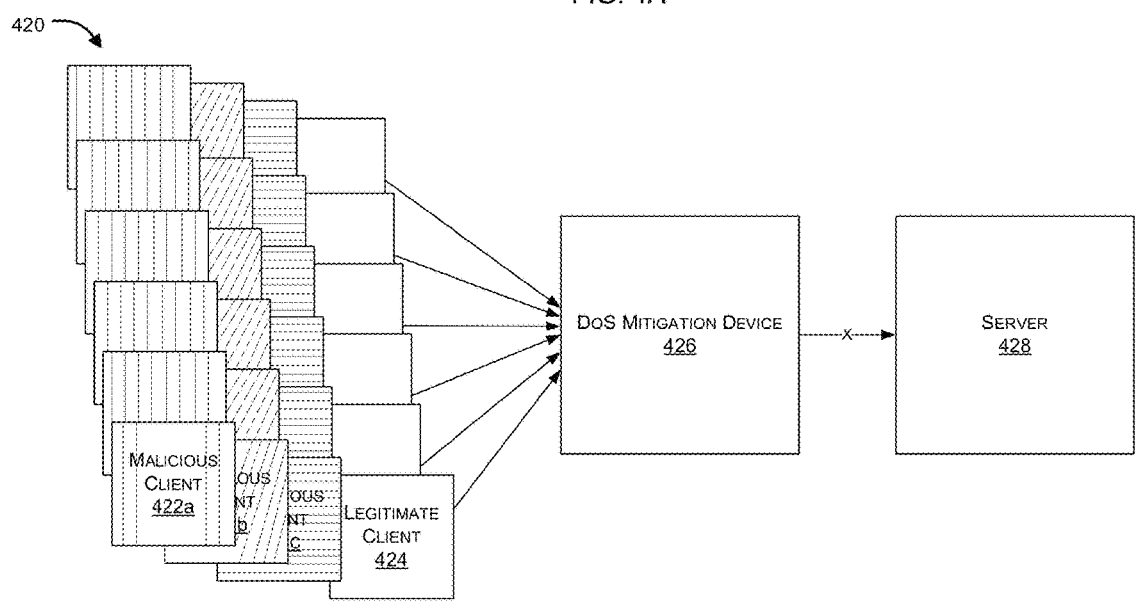
Figure 4C:
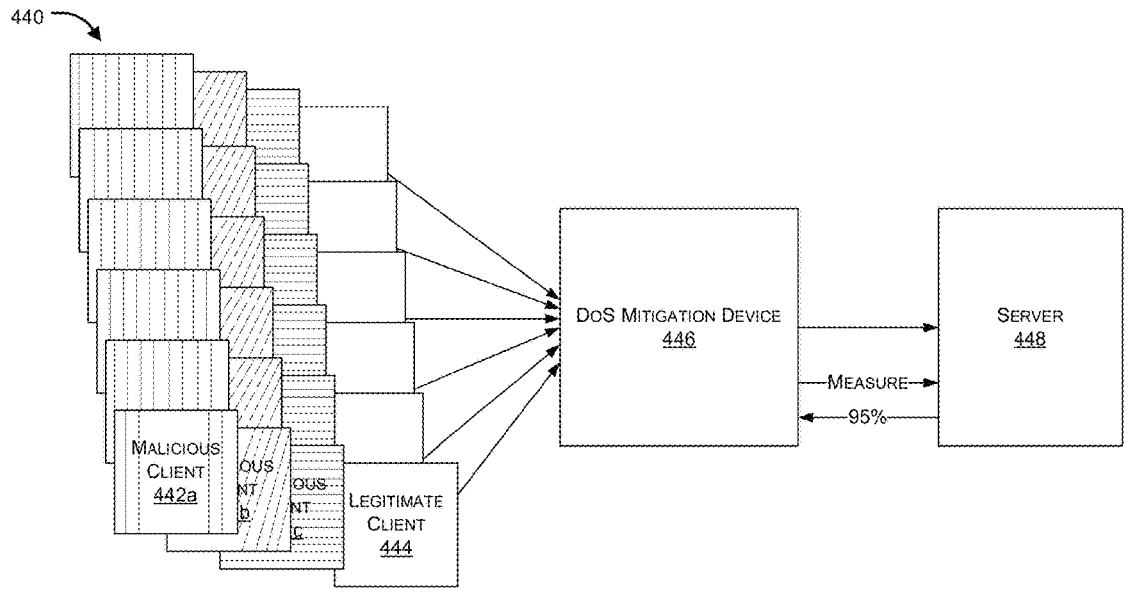

FIGS. 4A to 4D conceptually illustrate operation of a DoS mitigation device 426 in accordance with an embodiment of the present invention. As shown in FIG. 4A, a server 406 that is configured to receive connection requests and provide a service for which it has been configured, can receive connection requests from malicious clients 402a, 402b, 402c, and some legitimate client, e.g., 404. In the context of FIG. 4A, server 406 is under attack by malicious clients 402a-c and the flood of requests have caused server 406 to become unavailable (down). FIG. 4B shows a traditional DoS mitigation device 426 placed to mitigate DoS attack on server 428. As noted above, DoS mitigation device 426 may simply drop all subsequent connection requests once a threshold number of active connections has been reached. DoS mitigation device 426 drops packets/connections once the number of active connections with server 428 meets or exceeds a defined threshold, despite the fact that the capacity of the server 428 may allow it to handle additional connections. FIG. 4C illustrates a DoS mitigation device 446 that can measure one or more health conditions of a protected network resource (e.g., server 448) responsive to the number of active connections with server 448 reaching a predefined threshold. Alternatively, the health conditions may also be measured prior to the active connection threshold being reached.

Figure 4D:
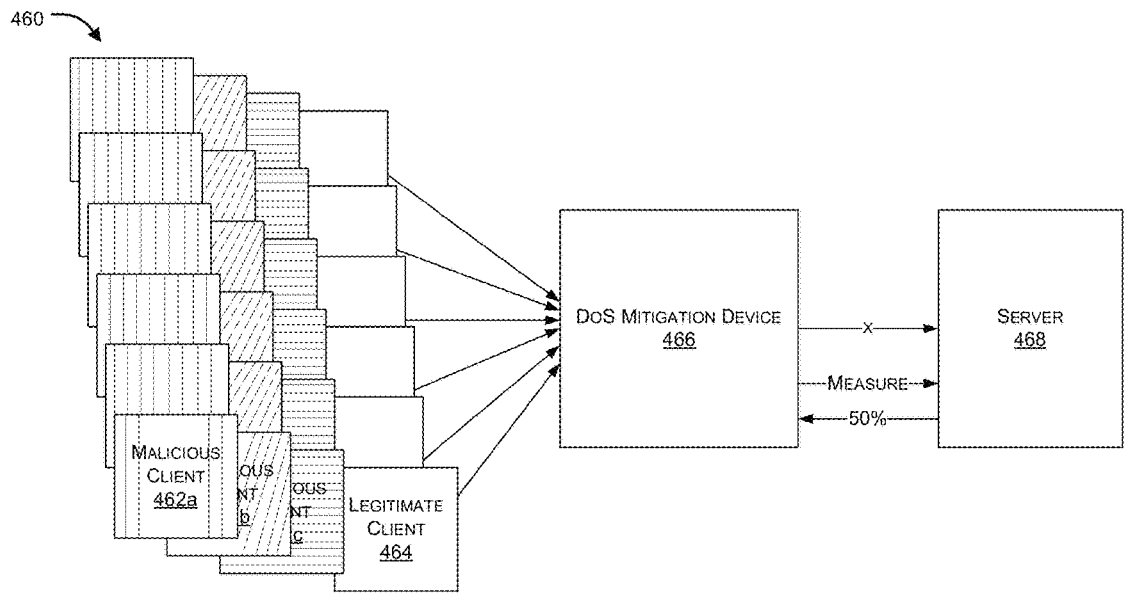

In an aspect, new connection requests coming from malicious clients 442*a-c* or from legitimate client 444 can be allowed or dropped based on the health of server 448. For example, if a particular measured capacity (e.g., CPU or memory resource utilization) of server 448 is 95% utilized, new connection requests may be dropped regardless of the number of active connections with server 448. DoS mitigation device 446 can therefore allow packet(s)/traffic to continue to be directed to server 448 when server 448 is in good health (e.g., operating at less than a predefined capacity (e.g., 95% utilization)). FIG. 4D illustrates an exemplary implementation of DoS mitigation device 466 that can monitor traffic originating from client computing devices, for example, malicious client 462*a-c* and legitimate client 464, being served by server 468 and can begin a mitigation process or enter a mitigation mode responsive to the number of active connections between the client devices and server 468 reaching a predefined threshold. In mitigation mode, DoS mitigation device 466 can continue to measure/monitor the health of server 468 and allow traffic directed to server 468 to pass while server 468 remains in good health. A health threshold can also be defined for enabling DoS mitigation device 466 to make decisions about forwarding or dropping of traffic.

FIG. 5 illustrates an exemplary DoS Mitigation Policy Definition Interface 500 of a DoS mitigation system in accordance with an embodiment of the present invention. As shown in FIG. 5, DoS mitigation device can provide DoS mitigation policy definition interface 500 to a network administrator to define DoS mitigation policy rules. The policy rules enable a user to select any or a combination of conditions to be used to trigger various DoS mitigation approaches.

A triggering condition can be based on a traffic-volume based DoS mitigation approach, which allows the network administrator to define a threshold of active connections. For example, the network administrator can configure the DoS mitigation device to block subsequent connections or service requests once the number of active connections with the protected network device is greater than 1,000. Similarly, interface 500 can allow the network administrator to define one or more parameters for a server-health-status based DoS mitigation approach, in which thresholds for one or more health parameters can be specified. For example, network administrator can choose to block subsequent connections/service requests once server CPU utilization is greater than 65%, when server memory utilization is greater than 70%, when server load is greater than 80%, and/or when sever latency is greater than 5 ms.

In an exemplary implementation, DoS mitigation device can be configured to use a traffic-volume based DoS mitigation approach, wherein the DoS mitigation device can block subsequent connections/service requests when the number of active connections with the protected device is greater than a threshold, for example 1,000 connections per second.

In another exemplary implementation, DoS mitigation device can be configured to use a server-health based DoS mitigation approach, wherein the DoS mitigation device can block subsequent connections or service requests when server CPU utilization is greater than 65%, when server memory utilization is greater than 70%, when server load is greater than 80%, and/or when sever latency is greater than 5 ms, or any combination thereof.

In one implementation, DoS mitigation device can be configured to use a DoS mitigation approach based on both traffic-volume and server-health-status. The DoS mitigation device can be configured to block subsequent traffic once the number of active connections is greater than a first defined threshold, say 1,000, and total server health (e.g., utilization of computing resources or network resources) is within a second defined threshold/range, say 0% to 70%.

In an aspect, the policy rules can be edited/adjusted by the network administrator. In another exemplary implementation, the policy rules can be updated adaptively based on performance of the DoS mitigation device and occurrence of false positives.

Figure 6:
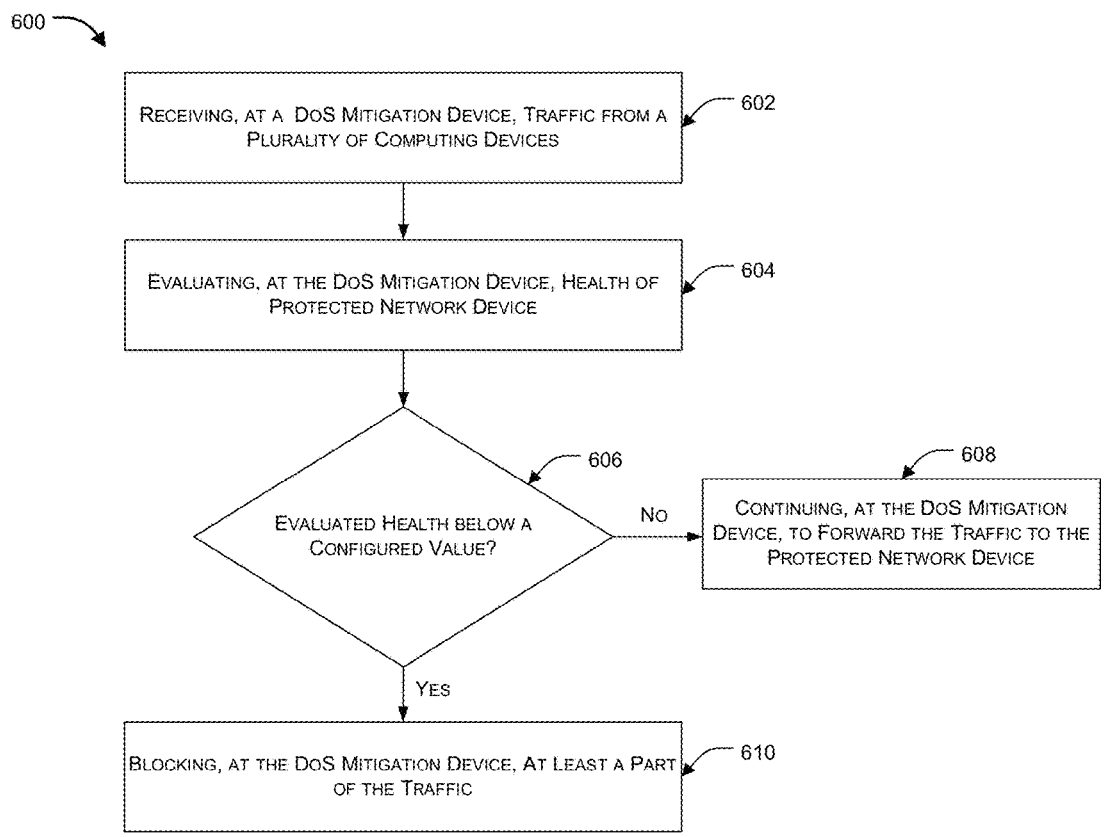
FIG. 6 is a flow diagram illustrating method for DoS mitigation processing based on health of protected network device in accordance with an embodiment of the present invention.

FIG. 6 is a flow diagram illustrating DoS mitigation processing based on the health of a protected network device in accordance with an embodiment of the present invention. The method for DoS mitigation processing 600 can include the steps of receiving, by the DoS mitigation device, traffic from one or more client computing devices, as shown at step 602, evaluating, by the DoS mitigation device, the health of the protected network device, as shown at step 604, determine whether the one or more evaluated health conditions re within a configured range or below a defined threshold as shown at step 606, and blocking, by the DoS mitigation device, at least a portion of traffic directed to the protected network device when the evaluated health conditions of the protected device are below (e.g., utilization of one or more computing resources and/or network resources of the protected network device is greater than a threshold) a configured value as shown at step 610. The method further includes the step of continuing, by the DoS mitigation device, to forward the traffic to the protected network device when the evaluated health conditions are satisfactory.

In an aspect, DoS mitigation device can be associated with a private network, and can be logically interposed between external client computing devices and the protected network device, wherein the proposed method can include the steps of evaluating, at the DoS mitigation device, the health of the protected network device, receiving, by the DoS mitigation device, traffic from the one or more computing devices, and selectively forwarding, by the DoS mitigation device, the traffic to the protected network device or dropping, by the DoS mitigation device, the traffic based on the health of the protected network device. In an exemplary implementation, the step of blocking at least a part of the traffic is performed when the health of the protected network device is below a preconfigured value, also referred as predefined health threshold.

Figure 7:
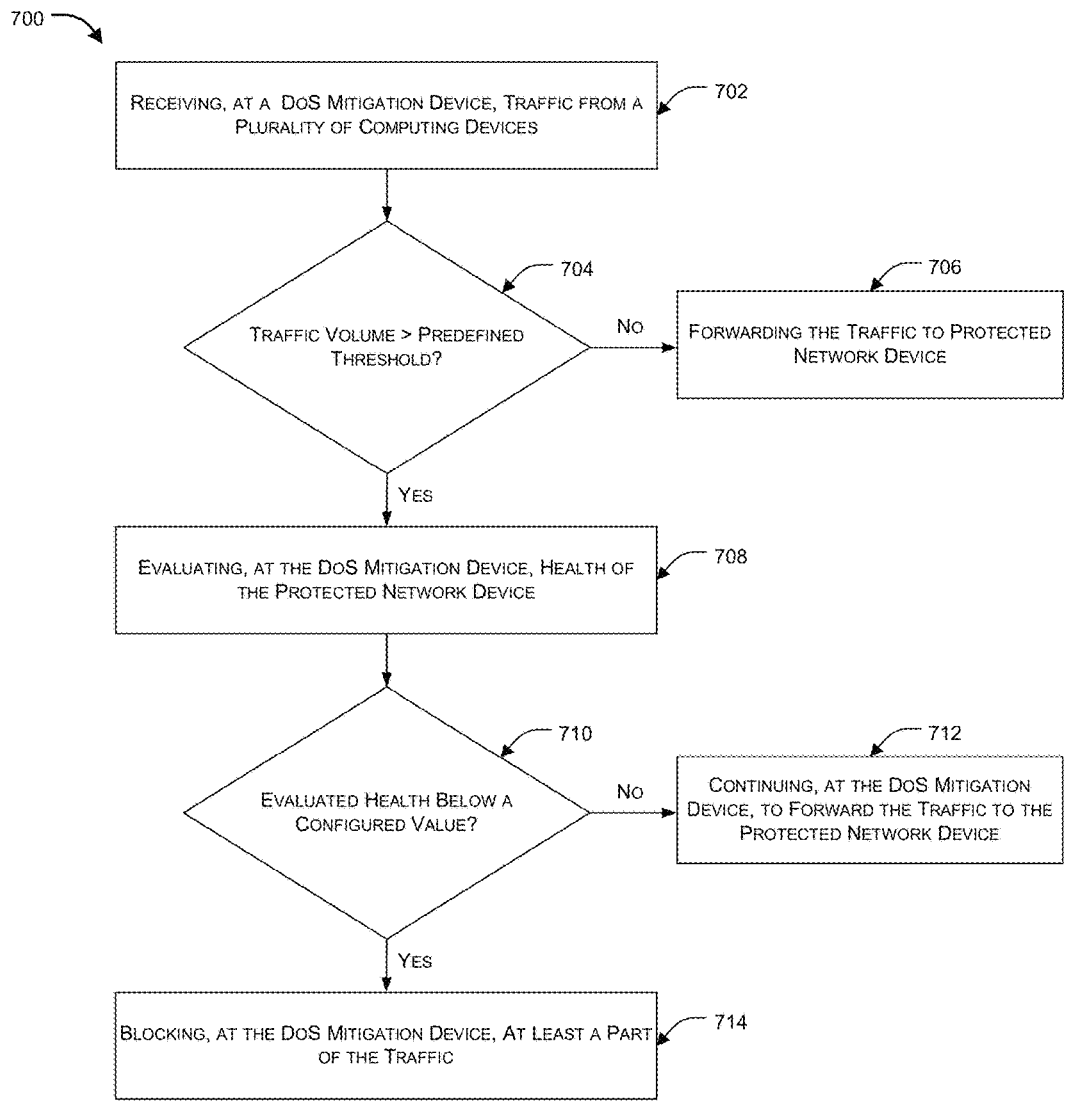
FIG. 7 is a flow diagram illustrating method for DoS mitigation processing based on threshold of number of active connections and health of protected network device in accordance with an alternative embodiment of the present invention.

FIG. 7 is a flow diagram illustrating method for DoS mitigation processing based on a threshold of number of active connections and a health status of a protected network device in accordance with an alternate embodiment of the present invention. In an aspect, the method can include the steps of receiving, by a DoS mitigation device, traffic from different computing devices, as shown at step 702; checking if the traffic volume is greater than a predefined threshold, as shown at step 704; evaluating, at step 706, by the DoS mitigation device, the health of the protected device when the traffic volume directed to the protected network device exceeds the predefined threshold; checking whether the evaluated health is below a configured value, as shown at step 710; and blocking, by the DoS mitigation device, at least part of the traffic as shown at step 714 responsive to the evaluated health of the protected network device being below the configured value. In an exemplary implementation, the method can include the steps of forwarding the traffic to the protected network device when the traffic volume is not greater than the predefined threshold as shown at step 706. The method further includes step of continuing, by the DoS mitigation device, to forward the traffic to the protected network device as shown at step 712 when the evaluated health is within a satisfactory range.

Figure 8:
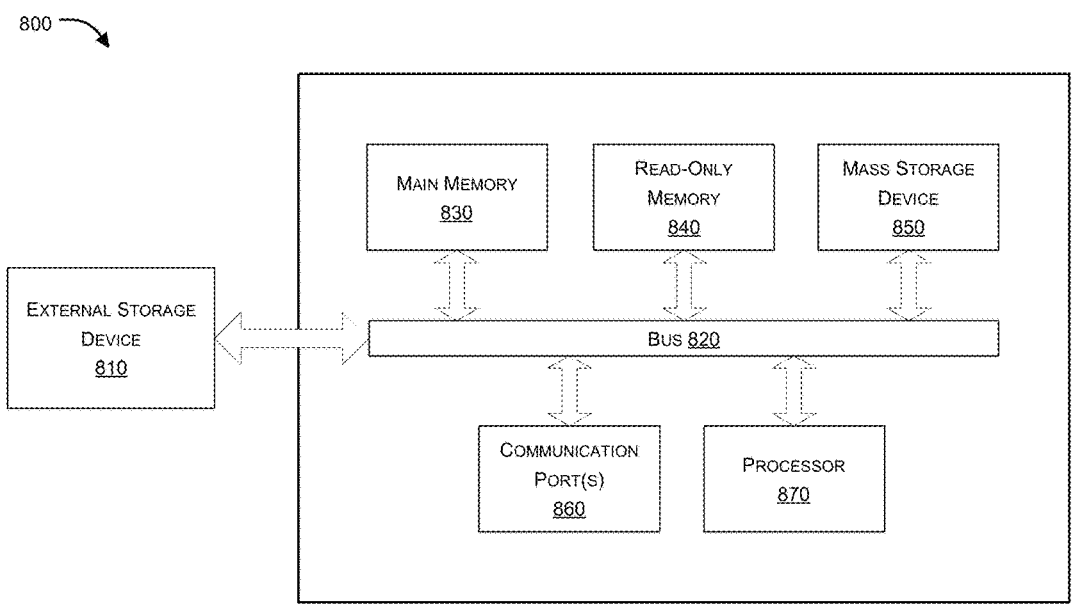
FIG. 8 is an example of a computer system with which embodiments of the present disclosure may be utilized.

FIG. 8 is an example of a computer system 800 with which embodiments of the present disclosure may be utilized. Computer system 800 may represent or form a part of a DoS mitigation device (e.g., an ADC with a DoS mitigation module integrated therein or a standalone DoS mitigation device), a gateway or other network appliance. Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware. As shown, computer system 800 includes a bus 830, a processor 805, communication port 810, a main memory 815, a removable storage media 840, a read only memory 820 and a mass storage 825. A person skilled in the art will appreciate that computer system 800 may include more than one processor and communication ports. Examples of processor 805 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 805 may include various modules associated with embodiments of the present invention. Communication port 810 can be any of an RS-232 port for use with a modem based dialup connection, a 10/100 Ethernet port, a Gigabit or 10 Gigabit port using copper or fiber, a serial port, a parallel port, or other existing or future ports. Communication port 810 may be chosen depending on a network, such a Local Area Network (LAN), Wide Area Network (WAN), or any network to which computer system 800 connects. Memory 815 can be Random Access Memory (RAM), or any other dynamic storage device commonly known in the art. Read only memory 820 can be any static storage device(s) e.g. a Programmable Read Only Memory (PROM) chips for storing static information e.g. start-up or BIOS instructions for processor 805. Mass storage 825 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc. Bus 830 communicatively couples processor(s) 805 with the other memory, storage and communication blocks. Bus 830 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 805 to software system. Optionally, operator and administrative interfaces, e.g. a display, keyboard, and a cursor control device, may also be coupled to bus 830 to support direct operator interaction with computer system 800. Other operator and administrative interfaces can be provided through network connections connected through communication port 810. Removable storage media 840 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

What is claimed is:

1. A method comprising:

receiving from an administrator of a private network, by a Denial of Service (DoS) mitigation device associated with the private network and logically interposed between a plurality of computing devices residing external to the private network and a network device protected by the DoS mitigation device, information indicative of a traffic metric threshold and one or more health parameter thresholds;

receiving, by the DoS mitigation device, traffic directed to the protected network device from the plurality of computing devices; and tracking, by the DoS mitigation device, a traffic metric representing a measure of the traffic being processed by the protected network device; and selectively forwarding or dropping, by the DoS mitigation device, the traffic based on a combination of the traffic metric, the traffic metric threshold, one or more health parameters associated with the protected network device and the one or more health parameter thresholds by:

when the traffic metric is at or below the traffic metric threshold, forwarding, by the DoS mitigation device, the traffic to the protected network device; and when the traffic metric is greater than the traffic metric threshold:

monitoring, by the DoS mitigation device, the one or more health parameters associated with the protected network device, the one or more health parameters individually or collectively indicative of an ability or an inability of the protected network device to handle additional traffic;

when a health status of the protected network device resulting from a comparison of the one or more health parameters to corresponding thresholds of the one or more health parameter thresholds is indicative of the ability of the protected network device to handle additional traffic, forwarding, by the DoS mitigation device, the traffic to the protected network device; and when the health status is indicative of the inability of the protected network device to handle additional traffic, preventing, by the DoS mitigation device, the traffic from being received by the protected network device by dropping the traffic.

2. The method of claim 1, wherein the traffic metric comprises a number of active connections maintained by the protected network device as a result of the received traffic.

3. The method of claim 1, wherein the traffic metric comprises a measurement of a number of connections per unit of time being processed by the protected network device as a result of the received traffic.

4. The method of claim 1, wherein the one or more health parameters include a load on the protected network device, a utilization of a central processing unit (CPU) of the protected network device, a utilization of a memory of the protected network device or a network utilization of the protected network device and wherein said monitoring comprises receiving, by the DoS mitigation device via an Application Programming Interface (API) of the DoS mitigation device, information regarding the one or more health parameters from the protected network device.

5. The method of claim 1, wherein the one or more health parameters include a response time or a latency between the DoS mitigation device and the protected network device and wherein said monitoring comprises measuring, by the DoS mitigation device, the response time or the latency.

6. The method of claim 1, wherein the protected network device comprises a server, and wherein the plurality of computing devices comprise client devices.

7. The method of claim 1, wherein the one or more health parameters are monitored in real-time or on a periodic basis.

8. The method of claim 1, wherein the DoS mitigation device comprises an Application Delivery Controller (ADC).

9. The method of claim 1, wherein the traffic metric is expressed in terms of a number of connections per second being handled by the protected network device.

10. The method of claim 1, wherein the one or more health parameters are selected from a group comprising a latency between the protected network device and the DoS mitigation device, a response time by the protected network device to the DoS mitigation device, one or more performance attribute values of the protected network device, a load on the protected network device, a memory utilization of the protected network device, a processor utilization of the protected network device, and a network utilization of the protected network device.

11. A Denial of Service (DoS) mitigation device comprising:

one or more processors; and a non-transitory storage device coupled to the one or more processors and having embodied therein instructions, which when executed by the one or more processors perform a method comprising:

receiving from an administrator of a private network with which the DoS mitigation device is associated, information indicative of a traffic metric threshold and one or more health parameter thresholds;

receiving traffic directed to a network device protected by the DoS mitigation device from a plurality of computing devices residing external to the private network; and tracking a traffic metric representing a measure of the traffic being processed by the protected network device; and selectively forwarding or dropping the traffic based on a combination of the traffic metric, the traffic metric threshold, one or more health parameters associated with the protected network device and the one or more health parameter thresholds by:

when the traffic metric is at or below the traffic metric threshold, forwarding the traffic to the protected network device; and when the traffic metric is greater than the traffic metric threshold:

monitoring the one or more health parameters, wherein the one or more health parameters are individually or collectively indicative of an ability or an inability of the protected network device to handle additional traffic;

when a health status of the protected network device resulting from a comparison of the one or more health parameters to corresponding thresholds of the one or more health parameter thresholds is indicative of the ability of the protected network device to handle additional traffic, forwarding the traffic to the protected network device; and when the health status is indicative of the inability of the protected network device to handle additional traffic, preventing the traffic from being received by the protected network device by dropping the traffic.

12. The DoS mitigation device of claim 11, wherein the traffic metric comprises a number of active connections maintained by the protected network device as a result of the received traffic.

13. The DoS mitigation device of claim 11, wherein the traffic metric comprises a measurement of a number of connections per unit of time being processed by the protected network device as a result of the received traffic.

14. The DoS mitigation device of claim 11, wherein the one or more health parameters include a load on the protected network device, a utilization of a central processing unit (CPU) of the protected network device, a utilization of a memory of the protected network device or a network utilization of the protected network device and wherein said monitoring comprises receiving via an Application Programming Interface (API) of the DoS mitigation device, information regarding the one or more health parameters from the protected network device.

15. The DoS mitigation device of claim 11, wherein the one or more health parameters include a response time or a latency between the DoS mitigation device and the protected network device and wherein said monitoring comprises measuring the response time or the latency.

16. The DoS mitigation device of claim 11, wherein the protected network device comprises a server, and wherein the plurality of computing devices comprise client devices.

17. The DoS mitigation device of claim 11, wherein the one or more health parameters are monitored in real-time or on a periodic basis.

18. The DoS mitigation device of claim 11, wherein the DoS mitigation device comprises an Application Delivery Controller (ADC).

19. The DoS mitigation device of claim 11, wherein the traffic metric is expressed in terms of a number of connections per second being handled by the protected network device.

20. The DoS mitigation device of claim 11, wherein the one or more health parameters are selected from a group comprising a latency between the protected network device and the DoS mitigation device, a response time by the protected network device to the DoS mitigation device, one or more performance attribute values of the protected network device, a load on the protected network device, a memory utilization of the protected network device, a processor utilization of the protected network device, and a network utilization of the protected network device.

* * * * *